H. McCONNELL.
STOVE ATTACHMENT FOR UTILIZING HEAT.

No. 188,160. Patented March 6, 1877.

WITNESSES
Ed. S. Nottingham.
Albert W. Bright.

INVENTOR
Hugh McConnell,
By Leggett & Leggett,
Attorneys

UNITED STATES PATENT OFFICE.

HUGH McCONNELL, OF CLEVELAND, OHIO.

IMPROVEMENT IN STOVE ATTACHMENTS FOR UTILIZING HEAT.

Specification forming part of Letters Patent No. 188,160, dated March 6, 1877; application filed June 19, 1876.

*To all whom it may concern:*

Be it known that I, HUGH McCONNELL, of Cleveland, in the county of Cuyahoga, and State of Ohio, have invented certain new and useful Improvements in Stove Attachments for Utilizing Heat; and I do hereby declare the following to be a full, clear, and exact description of the invention, such as will enable others skilled in the art to which it pertains to make and use it, reference being had to the accompanying drawings, which form part of this specification.

My invention relates to an attachment or implement for stoves, whereby the heat after its primary use may be further utilized for other purposes.

Figure 1:
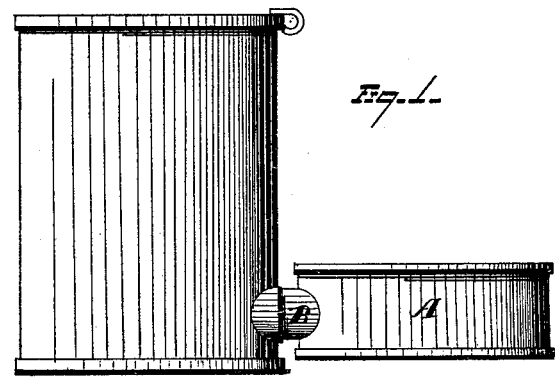
Figure 2:
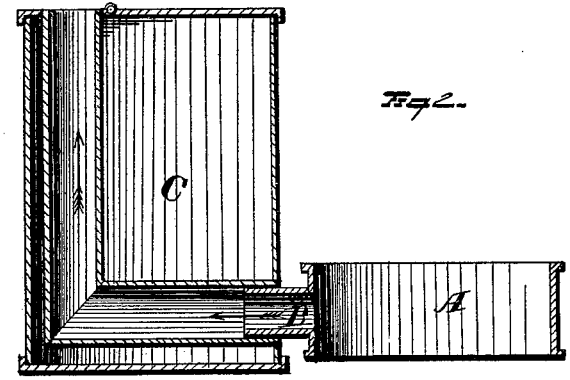

In the drawings, Figure 1 is an isometric view of a device according to my invention, and Fig. 2 is a longitudinal vertical section of the same, the arrows indicating the course and direction of the heat.

My invention consists in the following parts and combinations, as hereinafter specified and claimed, wherein A is a simple ring, cylinder, or the like, composed of metal or any suitable material, open at both ends. The part A may be made of any dimensions or fashion desired.

From its side proceeds the flue B, of any suitable length and dimensions. Instead of the flue B proceeding from the part A, there may be a simple opening made into said part A. If desired, a damper may be provided that shall govern the escape of heat through the said opening or flue B.

The operation of my device is as follows: It is placed over the source of heat, as shown in Fig. 2 of the drawings, and covered either by a lid or by anything desired to be heated, such as a kettle or the like.

It will be apparent that the heat will not only act upon said kettle, but will also escape through the opening or flue B, where it may be received, and conducted in any suitable manner to be utilized elsewhere. For instance, it may be conducted through a water-reservoir, and made to maintain a supply of warm water, or it may supply heat to a drying or warming chamber.

My invention is designed to be especially adaptable to portable stoves, such as gas-stoves, oil-stoves, &c., although I do not confine myself to its employment upon any particular stove or source of heat.

C is a water-reservoir, which may or may not be employed; but, for ordinary domestic purposes, it will usually be convenient to employ it. It will be observed that the flue B enters the side of the said reservoir C, and passes into it, making an elbow-bend upward through the said reservoir. This elbow-bend is preferably made abrupt, as shown in the drawings, though it may be made curved. The abrupt form, however, serves the more effectually to break up any direct draft, and thereby cause the heat to expend itself upon the walls of the said flue B. The flue within the reservoir is so located as to be entirely surrounded by the contained water.

I do not know that the flue of an oil-stove has ever before been made combining with it a water-reservoir, so as to be heated by the escaping products of combustion.

What I claim is—

1. The combination of the ring, cylinder, or body A, and a reservoir or other heating-chamber of a stove, the same being relatively independent and detachable, substantially as and for the purpose described.

2. The combination with the ring A, provided with vent or flue B, of the independent water-reservoir C, substantially as and for the purpose described.

In testimony whereof I have signed my name to this specification in the presence of two subscribing witnesses.

HUGH McCONNELL.

Witnesses:
L. L. LEGGETT,
FRANCIS TOUMEY.